(12) United States Patent
Rahman et al.

(10) Patent No.: US 7,571,016 B2
(45) Date of Patent: Aug. 4, 2009

(54) CROSSFADE OF MEDIA PLAYBACK BETWEEN DIFFERENT MEDIA PROCESSES

(75) Inventors: Shafiq Ur Rahman, Redmond, WA (US); Alexandre Grigorovitch, Redmond, WA (US); Adil Ahmed Sherwani, Redmond, WA (US); Sumedh N. Barde, Redmond, WA (US); Sohail Baig Mohammed, Redmond, WA (US); Kirt A. Debique, Redmond, WA (US); Kipley J. Olson, Redmond, WA (US); Patrick Nicholas Nelson, Fairfax Station, VA (US)

(73) Assignee: Microsoft Corporation, Redmond, WA (US)

( * ) Notice: Subject to any disclaimer, the term of this patent is extended or adjusted under 35 U.S.C. 154(b) by 556 days.

(21) Appl. No.: 11/221,664

(22) Filed: Sep. 8, 2005

(65) Prior Publication Data

US 2007/0076547 A1 Apr. 5, 2007

(51) Int. Cl.
*G06F 17/00* (2006.01)
*H04B 1/00* (2006.01)
*H04B 1/20* (2006.01)
(52) U.S. Cl. .............................. 700/94; 381/119; 369/4
(58) Field of Classification Search .................. 700/94; 369/1–12; 381/119, 10, 11, 56, 61, 104–109
See application file for complete search history.

(56) References Cited

U.S. PATENT DOCUMENTS 6,757,573 B1 * 6/2004 Ledoux et al. ................ 700/94

* cited by examiner

*Primary Examiner*—Curtis Kuntz
*Assistant Examiner*—Andrew C Flanders

(57) ABSTRACT

A method of crossfading a plurality of audio files comprising opening a first process, opening a second process hosting an audio renderer in which a first audio file of the plurality of audio files is cross faded with a second audio file of the plurality of audio files.

9 Claims, 6 Drawing Sheets

PRIOR ART   FIG. 1

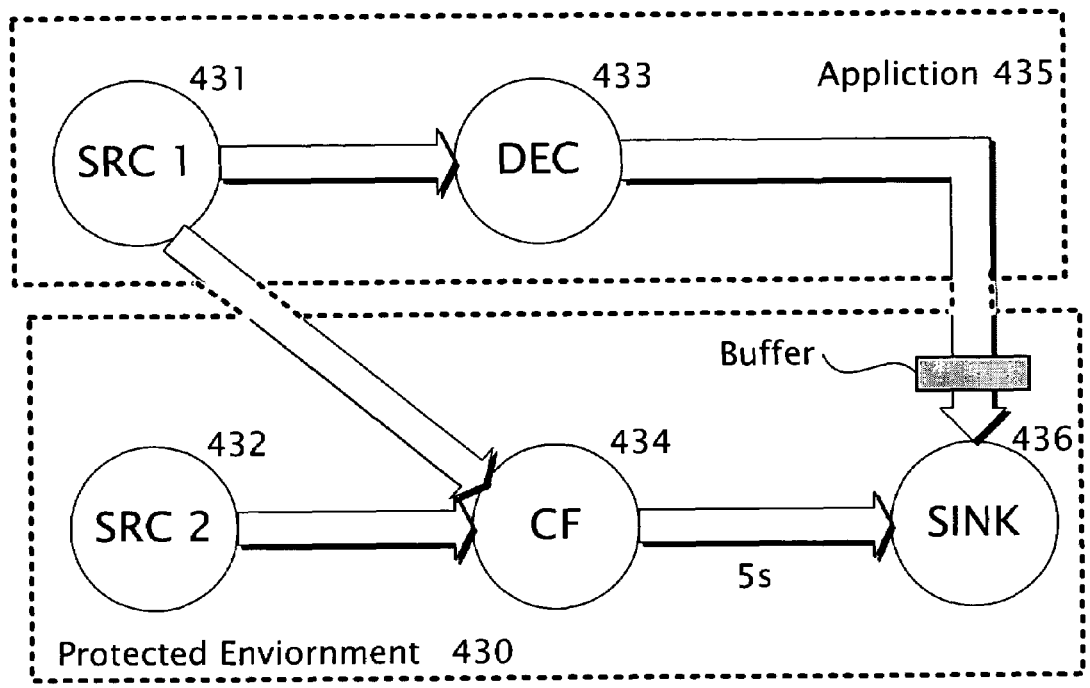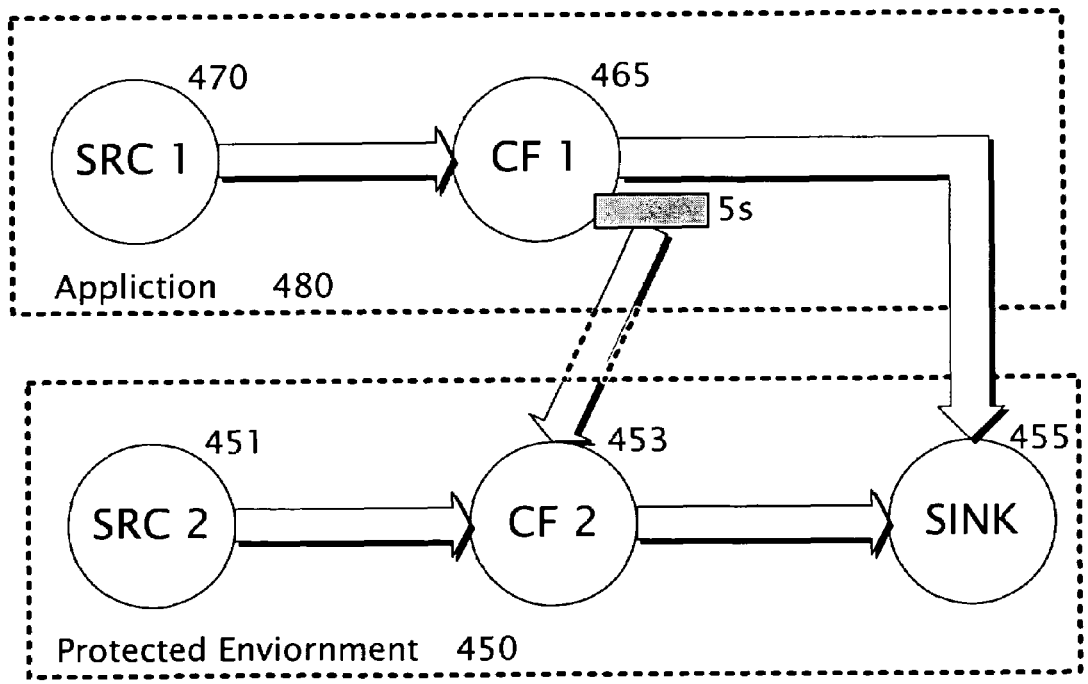
FIG. 4

CROSSFADE OF MEDIA PLAYBACK BETWEEN DIFFERENT MEDIA PROCESSES

BACKGROUND

This description relates generally to media players and more specifically to crossfading.

In media player applications content owners typically utilize secure content and delivery mechanisms in an effort to ensure that content is not improperly intercepted. As security concerns increase, challenges are often encountered in providing features, such as a crossfade, that allow security to be maintained, and that work properly.

DESCRIPTION OF THE DRAWINGS

The present description will be better understood from the following detailed description read in light of the accompanying drawings, wherein:

FIG. 4 shows a crossfade implementation for media files being processed in protected and unprotected environments.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a media player system, the system described is provided as an example and not a limitation. As those skilled in the art will appreciate, the present examples are suitable for application in a variety of different types of crossfade systems.

Figure 1:
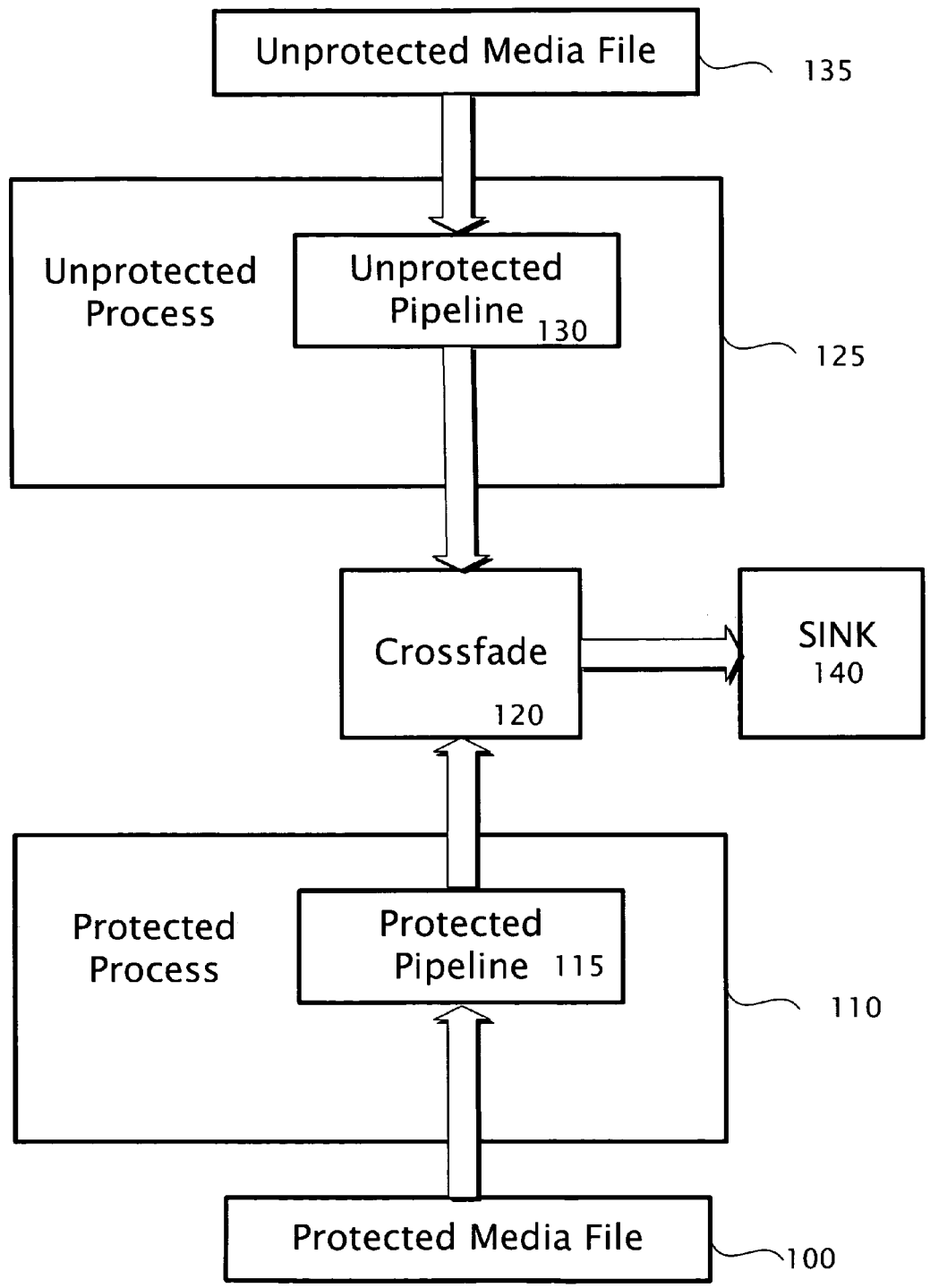
FIG. 1 is a block diagram showing a typical crossfade process.

FIG. 1 is a block diagram showing a typical crossfade process. Typically crossfade 120 may be applied to audio playing back in two separate processes 125 110. Typically the software objects used to render media in the two processes are different. The examples described below may use one process to host an audio renderer so that there are typically no glitches in playback as it is switched from the first audio file to the second audio file. The examples described may also use a 1-in 1-out effect to do a crossfade by buffering data. In this example buffering helps in passing data from one process to the other.

The two processes in which a crossfade may be performed may include one playing protected content 110 and another playing unprotected content 125. Such protected and unprotected processes may utilize a media pipelines 115, 130 to process the content 100, 135. In one implementation of a pipeline protected content 100 is rendered in a separate process 110 from the process 125 used to render unprotected content 135. The protected process is typically secure and may have limitations on which components can be loaded into the protected process. Only signed trusted software components, such as those making up a pipeline, are typically loaded into the protected process. Unprotected content may be rendered in the unprotected application process, as there are typically no stringent requirements on which components get access to the samples for this media. The actual software objects used to render protected and unprotected content are typically different and may reside in separate processes.

Figure 2:
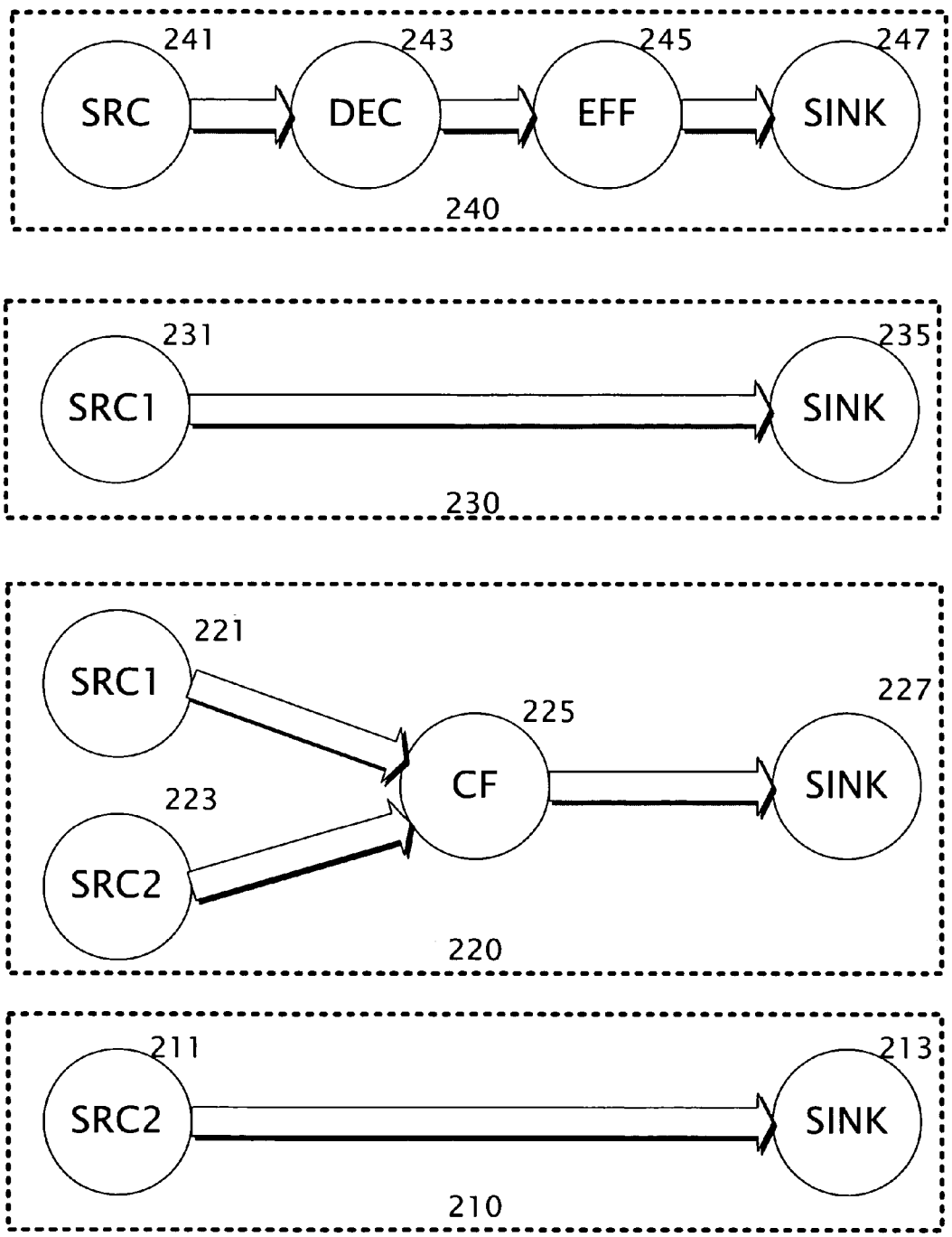
FIG. 2 shows a typical crossfade implementation. In a media player application a typical playback scenario involves a play list of media.

FIG. 2 shows a typical crossfade implementation. In a media player application a typical playback scenario involves a play list of media. The play list could have a mixture of protected and unprotected content. While playing a play list, users can choose to crossfade between consecutive songs.

A typical crossfade involves overlapping the end of a song with the beginning of the next song while the first song is fading out and the next song is fading in. This is usually done by mixing the end of one song with the beginning of another. Crossfading between a protected and an unprotected song may be challenging because the actual components being used to render the audio are different and are disposed in separate processes.

A typical media pipeline that may include a crossfade effect is shown 240. A source 241 that may be an encrypted or unencrypted media file read from a CD, a disk, the internet, or the like may be coupled to one or more transforms 243, 245. Transforms may include decoders for uncompressing samples 243, and various effects 245 that may be applied to uncompressed sample data. In the process described in this document it is understood that the pipelines shown may include other effects such as encoding, decoding, various effects and the like. At the end of such a media pipeline a sink 247 may be coupled to the end of the transforms. A sink may typically include an object that communicates with an audio or video card such as speakers, or the like.

In particular crossfade may typically be implemented in two parts. A first process 230 is created to play a first media file provided by a first source 231. The first source may be coupled to a sink 235. This process 230 plays the first media file in a conventional manner.

A second process is formed 220 that may be set up to process the first media file in a first source 221, and a second media file in a second source 223. The first source 221, and the second source 223 are coupled to a conventional crossfade transform 225, which provides an output to a sink 227. This second process is typically initiated during the period of time in which the cross fade effect is desired.

A third process 210 is initiated after the cross fade effect to finish playing the second media file. In this process the second source 211 is coupled to a sink 213

Figure 3:
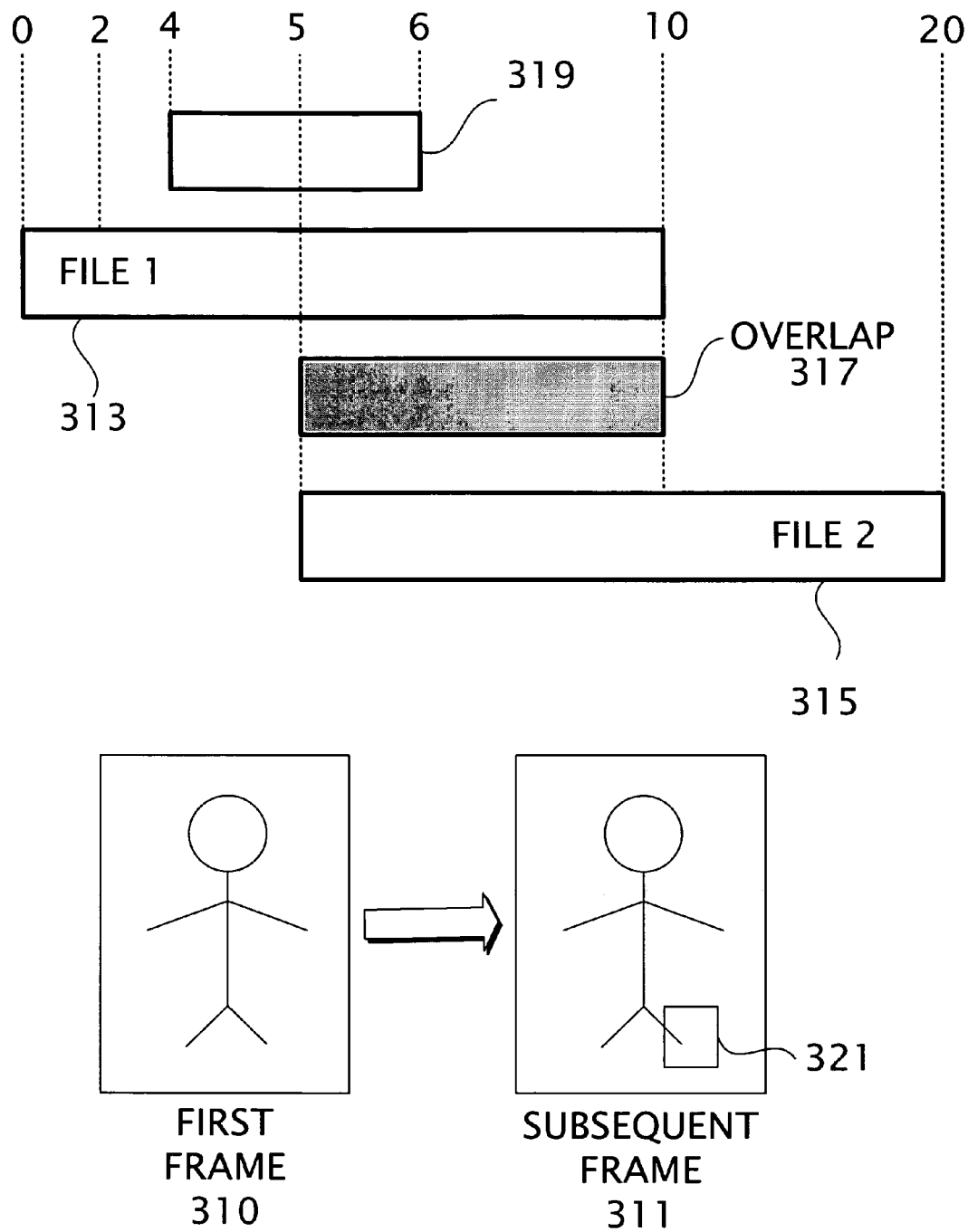
FIG. 3 shows a timeline illustrating a timeline of a crossfade effect.

FIG. 3 shows a timeline illustrating a timeline of a crossfade effect. A first file 313, and a second file 315 are played so that there is a period of overlap 317 in which the crossfade effect is implemented. The exemplary first process 230 (of FIG. 2) occurs in the time interval prior to the overlap 317. The second process 220 (of FIG. 2) is executed during the period of overlap 217. And the third process 210 (of FIG. 2) is executed during the period of time after the overlap.

A sample 319 that is part of the first file 313 will typically not be synchronized to the beginning of the cross fade. Thus the beginning of a cross fade effect may fall sometime within a sample. Thus the first portion of the data sample would be needed during playback of the first file, and the second portion of the sample would be needed during the crossfade effect.

A keyframe 310 typically starts the playback process. A key frame typically has all of the information to render a graphic, or a sound file. Subsequent frames typically only are made up of data that represents changes from the previous sample or frame 321.

Thus in a media player operating in a single process each of the three topologies will be activated in sequence to achieve the desired crossfade effect. Maintaining playback in the same process, and the same sink tends to prevent glitches in playback since different audio cards and the like need not be initialized. However, when using a protected process in conjunction with an unprotected process glitches may occur with this scheme, especially since the sink is reinitialized when switching between processes.

FIG. 4 shows a crossfade implementation for media files being processed in protected and unprotected environments. To use the same audio renderer when transitioning from one process to the other typically a new audio renderer will be created. This is typically not good for a seamless audio crossfade as it may cause a glitch during playback. In order the use the same audio render the media player creates a renderer in the protected process and uses it even for rendering the audio for unprotected content. Thus the same audio renderer may be used for the whole play list.

First a process is created in an application 435. In this process a source 431 for playing an unprotected media file is created, as well as an optional decoder object 433. However the sink 436 is not provided in this application process 435, it is provided in a protected environment process 430.

In a protected environment 430, the process previously described is duplicated for playback of the protected media file by a second source 432. The second source 432 is coupled to the crossfade object 434 and in turn to a sink 436, that has been opened in the protected environment. The crossfade 434 from the application is coupled to the sink 436 disposed in the protected environment 430. Thus the samples from the application process 435 are routed to the sink in the protected process 430. And the sink 436 need only be initialized once. In an alternative example the first source is passed through a decoder before being applied to the cross fade process. In addition buffering may be provided for crossfading just prior to the sink 436.

In an alternative embodiment 450, 480 of the process just described buffering may be employed in implementing a crossfade in a protected environment. A protected process 450, and an application process 480 are opened. The application process includes a first source 470 coupled to a buffered cross fade 465. The buffered crossfade 465 is coupled to a sink 455 disposed in the protected environment 450. In the protected environment a second source 451 is coupled to a second crossfade process 453, which is in turn coupled to the sink 455. In this example the buffered portion of the first source is coupled to the second crossfade 453 to create the cross fade effect.

Figure 5:
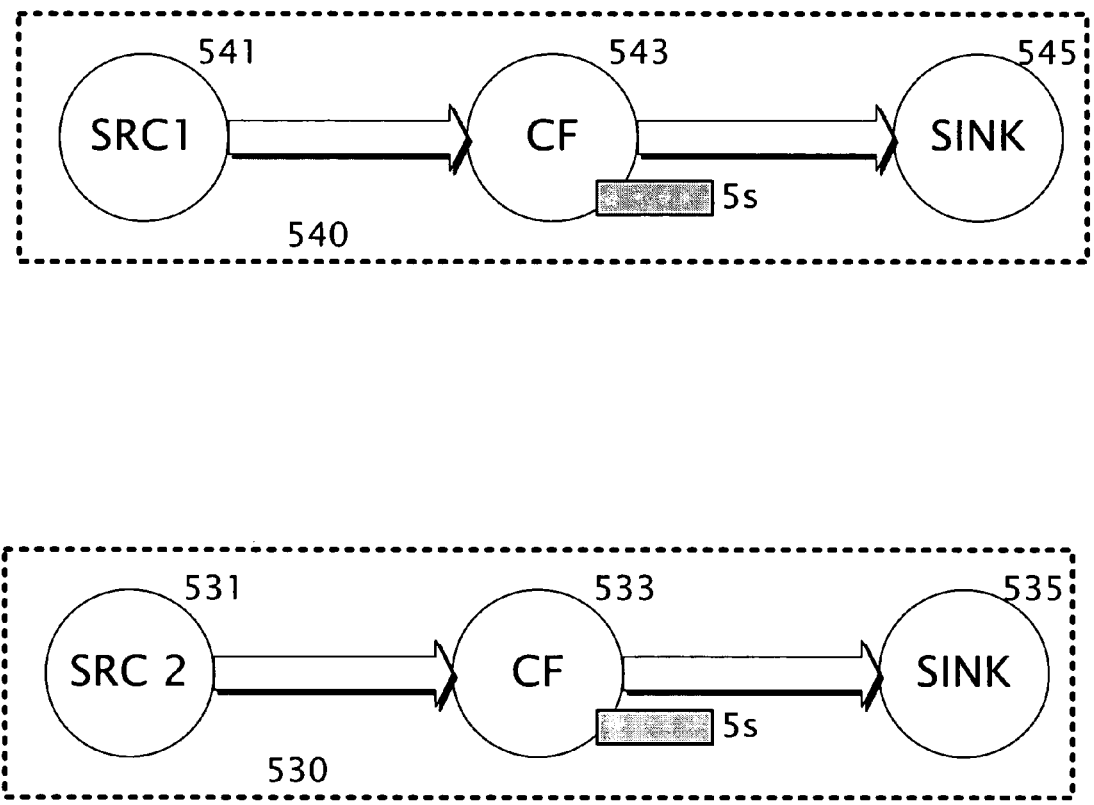
FIG. 5 is a diagram showing a cross fade process utilizing buffering.

FIG. 5 is a diagram showing a cross fade process utilizing buffering. In this process one input and one output may be maintained. A first process 540 is created in which a first source 541 is coupled to a crossfade object with buffering 543, which is in turn coupled to a sink 545. A second process 530 is created in which a second source 531 is coupled to a cross fade object with buffering 533. The cross fade with buffering object 533 is coupled to a sink 535. In the first process data is buffered before sending it to the sink. Thus at prior to ending playback a final portion of the data remains in the buffer of the first crossfade process at the end of playback. In the second process the first portion of data to fill the buffer of its crossfade object 533 is mixed with the final portion of data from the first process to create a crossfade effect.

A crossfade DirectX media object ("DMO") approach to crossfade is done by buffering some amount of data from the current song. If the crossfade duration has been set to 5 seconds, the crossfade DMO buffers up to 5 seconds of data. When all the samples for the first song have been delivered from the source, the crossfade DMO will hold onto 5 seconds of data. This data is then used in the media pipeline for the next song to be mixed in with the beginning of the next song. This mixing causes the crossfade effect. When shifting between processes to playback a mixed protected/unprotected play list, media player can use this arrangement to pass data for crossfading between the protected and unprotected songs.

A protected environment tends to limit unauthorized access to media content and other data. A protected environment may be formed when a computer system is started and the kernel of the operating system is loaded and a kernel secure flag is set to an initial value. The process continues through the time that a protected environment is typically created and an application is typically loaded into it. The process includes periodic checking via the protected environment that seeks to ensure the system remains secure through the time the secure process is needed. A protected environment is further described in U.S. patent application Ser. No. 11/116,598, filed Apr. 27, 2005, the contents of which are herein incorporated by reference. Those skilled in the art will realize that other equivalent protected environments may be utilized in the examples provided above.

Figure 6:
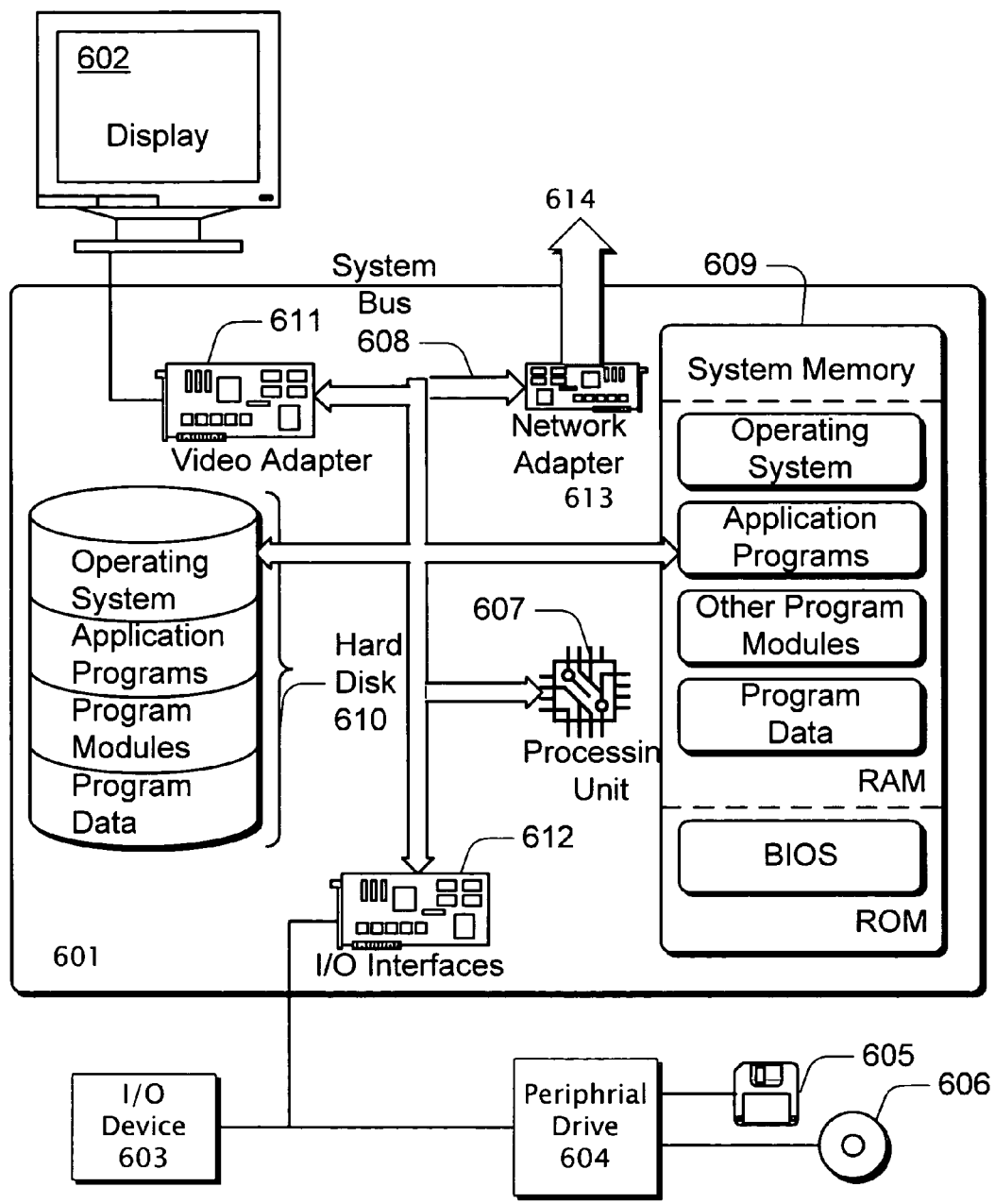
FIG. 6 illustrates an exemplary computing environment in which the cross fade described in this application, may be implemented.

FIG. 6 illustrates an exemplary computing environment 600 in which the cross fade described in this application, may be implemented. Exemplary computing environment 600 is only one example of a computing system and is not intended to limit the examples described in this application to this particular computing environment.

For example the computing environment 600 can be implemented with numerous other general purpose or special purpose computing system configurations. Examples of well known computing systems, may include, but are not limited to, personal computers, hand-held or laptop devices, microprocessor-based systems, multiprocessor systems, set top boxes, gaming consoles, consumer electronics, cellular telephones, PDAs, and the like.

The computer 600 includes a general-purpose computing system in the form of a computing device 601. The components of computing device 601 can include one or more processors (including CPUs, GPUs, microprocessors and the like) 607, a system memory 609, and a system bus 608 that couples the various system components. Processor 607 processes various computer executable instructions, including those to control the operation of computing device 601 and to communicate with other electronic and computing devices (not shown). The system bus 608 represents any number of several types of bus structures, including a memory bus or memory controller, a peripheral bus, an accelerated graphics port, and a processor or local bus using any of a variety of bus architectures.

The system memory 609 includes computer-readable media in the form of volatile memory, such as random access memory (RAM), and/or non-volatile memory, such as read only memory (ROM). A basic input/output system (BIOS) is stored in ROM. RAM typically contains data and/or program modules that are immediately accessible to and/or presently operated on by one or more of the processors 607.

Mass storage devices 604 may be coupled to the computing device 601 or incorporated into the computing device by coupling to the bus. Such mass storage devices 604 may include a magnetic disk drive which reads from and writes to a removable, non volatile magnetic disk (e.g., a "floppy disk") 605, or an optical disk drive that reads from and/or writes to a removable, non-volatile optical disk such as a CD ROM or the like 606. Computer readable media 605, 606 typically embody computer readable instructions, data structures, program modules and the like supplied on floppy disks, CDs, portable memory sticks and the like.

Any number of program modules can be stored on the hard disk 610, Mass storage device 604, ROM and/or RAM 609, including by way of example, an operating system, one or more application programs, other program modules, and program data. Each of such operating system, application programs, other program modules and program data (or some combination thereof) may include an embodiment of the systems and methods described herein.

A display device 602 can be connected to the system bus 608 via an interface, such as a video adapter 611. A user can interface with computing device 702 via any number of different input devices 603 such as a keyboard, pointing device, joystick, game pad, serial port, and/or the like. These and other input devices are connected to the processors 607 via input/output interfaces 612 that are coupled to the system bus 608, but may be connected by other interface and bus structures, such as a parallel port, game port, and/or a universal serial bus (USB).

Computing device 600 can operate in a networked environment using connections to one or more remote computers through one or more local area networks (LANs), wide area networks (WANs) and the like. The computing device 601 is connected to a network 614 via a network adapter 613 or alternatively by a modem, DSL, ISDN interface or the like.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. A method of crossfading a plurality of audio files comprising:
opening a first process controlled by one or more processors, the first process including a first source and a decoder, the first source being coupled to the decoder;
opening a second process controlled by the one or more processors and hosting an audio renderer in which a first audio file of the plurality of audio files is cross faded with a second audio file of the plurality of audio files, wherein the second process is a protected process, the second process including a second source, a crossfade and a sink, wherein the first source and the second source are coupled to the crossfade, and wherein the decoder and the crossfade are coupled to the sink, and wherein the first audio file is an unprotected media file provided to the first source and the second audio file is a protected media file provided to the second source, wherein the entire first audio file and the second audio file are output via the crossfade and the sink in the second process.

2. The method of claim 1 in which the first process is an unprotected process.

3. The method of claim 1 in which the first process includes a media pipeline.

4. The method of claim 1 in which the second process includes a media pipeline.

5. The method of claim 1 in which the sink is buffered.

6. A system for cross fading comprising:
one or more memories; and
one or more processors operated with the one or more memories to provide:
a first process including a first source and a first buffered crossfade, wherein the first source is coupled to the first buffered crossfade, and wherein an unprotected media file is associated with the first source, and
a second process including a second source, a second buffered crossfade and a sink, wherein the second process is in a protected environment, wherein the second source is coupled to the second buffered crossfade, wherein the second buffered crossfade is coupled to the sink, and wherein the first crossfade is coupled to the sink, wherein a protected media file is associated with the second source, and wherein the entire unprotected media file and the protected media file are output via the second buffered crossfade and the sink in the second process.

7. The system for crossfading of claim 6 in which the first process is opened in a unprotected environment.

8. A system for cross fading comprising;
one or more memories; and
one or more processors operated with the one or more memories to provide:
a first process including a first source and a decoder, an unprotected media file being coupled to the first source, and the first source being coupled to a decoder; and
a second secure process including a second source, a cross fade and a sink, a protected media file being coupled to the second source, the second source being coupled to the cross fade, the cross fade being coupled to the sink, the decoder being coupled to the sink, and the first source being coupled to the cross fade, wherein the entire unprotected media file and the protected media file are output via the cross fade and the sink in the second process.

9. The system for cross fading of claim 8 in which an output of the decoder is buffered between the decoder and the sink.

* * * * *